United States Patent
Chien et al.

(10) Patent No.: US 8,979,040 B2
(45) Date of Patent: Mar. 17, 2015

(54) SUPPORTING DEVICE

(75) Inventors: Chih-Heng Chien, Taipei (TW);
Chin-Yi Wu, Taipei (TW); Chun-Han Cheng, Taipei (TW); Kuo-Chou Chiu, Taipei (TW)

(73) Assignee: ASUSTeK COMPUTER Inc., Taipei (TW)

( * ) Notice: Subject to any disclaimer, the term of this patent is extended or adjusted under 35 U.S.C. 154(b) by 0 days.

(21) Appl. No.: 13/602,993

(22) Filed: Sep. 4, 2012

(65) Prior Publication Data

US 2013/0087666 A1 Apr. 11, 2013

Related U.S. Application Data

(60) Provisional application No. 61/544,091, filed on Oct. 6, 2011.

(51) Int. Cl.
| | | |
|---|---|---|
| F16M 11/00 | (2006.01) | |
| F16M 11/04 | (2006.01) | |
| F16M 13/00 | (2006.01) | |
| F16M 11/10 | (2006.01) | |
| F16M 11/20 | (2006.01) | |

(52) U.S. Cl.
CPC ............ *F16M 11/041* (2013.01); *F16M 13/00* (2013.01); *F16M 11/10* (2013.01); *F16M 11/2014* (2013.01); *F16M 2200/08* (2013.01); *Y10S 248/917* (2013.01); *Y10S 248/919* (2013.01)
USPC .......... 248/122.1; 248/121; 248/917; 248/919

(58) Field of Classification Search
CPC ........... F21V 21/26; E04G 3/00; G03B 17/00; A45D 19/04; A47J 19/04
USPC ............. 248/121, 126, 127, 537, 205.5, 596, 248/397, 419, 183.1, 185.1, 284.1, 674, 248/178.1, 184.1, 125.9, 183.3, 183.4, 248/292.12, 292.13, 557, 220.21, 222.51, 248/222.52, 917, 918, 919, 920, 921, 922, 248/923; 396/425, 428
See application file for complete search history.

(56) References Cited

U.S. PATENT DOCUMENTS

| | | | | |
|---|---|---|---|---|
| 4,066,231 | A * | 1/1978 | Bahner et al. | 248/552 |
| 5,187,744 | A * | 2/1993 | Richter | 379/449 |
| 6,053,461 | A * | 4/2000 | Goss | 248/127 |
| 6,179,263 | B1 * | 1/2001 | Rosen et al. | 248/278.1 |
| 6,766,994 | B2 * | 7/2004 | Serbinski et al. | 248/371 |
| 6,854,902 | B2 * | 2/2005 | Marek | 396/425 |
| 7,182,301 | B1 * | 2/2007 | Oddsen et al. | 248/122.1 |

(Continued)

FOREIGN PATENT DOCUMENTS

CN 201916659 U 8/2011

*Primary Examiner* — Monica Millner
(74) *Attorney, Agent, or Firm* — Muncy, Geissler, Olds & Lowe, P.C.

(57) ABSTRACT

A supporting device is applied to an electronic device and includes a supporting unit, an adjusting unit and a fixing unit. The supporting unit supports the electronic device. The adjusting unit is connected to the supporting unit for adjusting an angle of the supporting unit. The fixing unit includes a locking part and a fixing part. The fixing part is fixed on a surface, and the locking part connects to the adjusting unit. The locking part is detachably locked with the fixing part so as to fixing the electronic device on the surface. The supporting device is advantageous for providing multiple viewing angles for users, and it is conveniently carried and easily assembled, thereby achieving firmly fixing effect.

6 Claims, 7 Drawing Sheets

(56) References Cited

U.S. PATENT DOCUMENTS

| | | | |
|---|---|---|---|
| 7,520,481 B2* | 4/2009 | Jopling | 248/292.12 |
| 7,614,601 B2* | 11/2009 | Marsilio et al. | 248/551 |
| 7,740,214 B2* | 6/2010 | Marsilio et al. | 248/178.1 |
| 8,020,816 B2* | 9/2011 | Laitila et al. | 248/125.7 |
| 8,146,869 B2* | 4/2012 | Wang et al. | 248/125.2 |
| 8,317,152 B1* | 11/2012 | Zhou | 248/596 |
| 8,536,827 B2* | 9/2013 | Gourley | 320/107 |
| 2004/0011932 A1* | 1/2004 | Duff | 248/157 |
| 2007/0120024 A1* | 5/2007 | Oddsen et al. | 248/122.1 |
| 2008/0042020 A1* | 2/2008 | Laitila et al. | 248/131 |
| 2010/0171021 A1* | 7/2010 | Smith | |
| 2010/0214469 A1* | 8/2010 | Duncan | 348/373 |
| 2011/0068920 A1* | 3/2011 | Yeager et al. | 340/568.8 |
| 2011/0075350 A1* | 3/2011 | Lindblad et al. | 361/679.41 |
| 2011/0095143 A1* | 4/2011 | Wang et al. | 248/122.1 |
| 2011/0127392 A1 | 6/2011 | Carter | |
| 2011/0174937 A1* | 7/2011 | Sullivan | 248/122.1 |
| 2012/0020046 A1* | 1/2012 | Takashima | 361/807 |
| 2012/0175474 A1* | 7/2012 | Barnard et al. | 248/122.1 |
| 2012/0273630 A1* | 11/2012 | Gillespie-Brown et al. | 248/122.1 |
| 2013/0026324 A1* | 1/2013 | Fischer et al. | 248/316.1 |
| 2013/0048802 A1* | 2/2013 | Guran | 248/122.1 |
| 2013/0078855 A1* | 3/2013 | Hornick et al. | 439/571 |
| 2013/0135803 A1* | 5/2013 | Johnson et al. | 361/679.01 |

\* cited by examiner

SUPPORTING DEVICE

CROSS REFERENCE TO RELATED APPLICATIONS

The non-provisional patent application claims priority to U.S. provisional patent application with Ser. No. 61/544,091 filed on Oct. 6, 2011. This and all other extrinsic materials discussed herein are incorporated by reference in their entirety.

BACKGROUND OF THE INVENTION

1. Field of Invention

The present disclosure relates to a supporting device and, in particular, to a supporting device for an electronic device.

2. Related Art

Accompanying the progressive of technology, various kinds of electronic products have been developed for providing better life quality. In order to broaden the applications, many varied electronic products become easily portable and operable anytime. These electronic products include, for example, smart phones, PDA, handheld game consoles, tablet computers, or the likes. They provide a sufficient convenience in our lives and businesses.

Among the above electronic products, the tablet computer is a larger portable electronic device, so that the user can not hold it steadily during operation. Otherwise, when the tablet computer is placed on the tabletop, the screen of the tablet computer is parallel to the tabletop, so that the user must move his/her eyes to the top of the screen to view the displayed image. However, this posture usually results in shoulder soreness and eyestrain of the user, which is unhealthy to the users. Accordingly, the supporting device for the electronic device is introduced.

Regarding to the current supporting device of tablet computers, the available rotation angle and applications of most supporting devices are usually limited. If the supporting device is designed with larger rotation angle and better stability, it will have more complex structure and larger dimension, so that it is uncomfortable in carrying and operation. However, the portable simple supporting device can not firmly and stably fixed at the operation environment. If brief, when the user needs to operate the tablet computer for a long time or change operation locations frequently, the conventional supporting device can not fully support the requirements of the user. This may affect the portability and applications of the tablet computers.

SUMMARY OF THE INVENTION

The present disclosure discloses a supporting device applied to an electronic device and including a supporting unit, an adjusting unit and a fixing unit. The supporting unit supports the electronic device. The adjusting unit is connected to the supporting unit for adjusting an angle of the supporting unit. The fixing unit includes a locking part and a fixing part. The fixing part is fixed on a surface, and the locking part is connected to the adjusting unit. The locking part is detachably locked with the fixing part so as to fixing the electronic device on the surface.

In one embodiment, the supporting unit has a clipping part for fixing the electronic device.

In one embodiment, the clipping part is adjustable with respect to the supporting unit.

In one embodiment, the supporting device further comprises a first connector disposed on the supporting unit for connecting with the electronic device.

In one embodiment, the supporting device further comprises a second connector disposed on the locking part and electrically connected with the first connector.

In one embodiment, the supporting device further comprises a third connector disposed on the fixing part. When the locking part is locked with the fixing part, the third connector is electrically connected with the second connector.

In one embodiment, the inner wall of the locking part has a thread corresponding to a thread formed on outer wall of the fixing part.

In one embodiment, the adjusting unit has a first adjusting member and a second adjusting member, and the first adjusting member is pivotly connected to the second adjusting member.

In one embodiment, the locking part has a pivot, and the adjusting unit is mounted on the pivot so that it is rotatably connected to the locking part.

As mentioned above, the supporting device of the disclosure has a supporting unit for supporting the electronic device and an adjusting unit for adjusting an angle of the electronic device with respect to a user. Accordingly, when operating the electronic device, the user can easily move to the optimum view angle and operate it for a long time.

The locking part and fixing part of the fixing unit are detachable. Accordingly, the fixing part can be configured on an object surface at frequently used environments, and the user carries only the residual portion of the supporting device, thereby making the operation of the supporting device more convenient. Moreover, since it is unnecessary to carry the fixing part all the time, the design and material of the fixing part can be properly selected to enhance the stability. In this case, the heavy weight of the fixing part will not cause any uncomfortable in operation and can improve the fixing effect.

Besides, the connection structure of the locking part and the fixing part is very simple, so that the supporting device can be easily and rapidly installed or uninstalled. For example, the locking part and the fixing part can be connected by corresponding screw threads. In practice, the supporting device of this disclosure can provide firm supporting and adjustable view angle. Compared with the conventional art, it is conveniently carried, easily assembled, and can achieve firmly fixing effect.

These and other features, aspects and advantages of the present disclosure will become better understood with regard to the following description, appended claims, and accompanying drawings.

DETAILED DESCRIPTION OF THE INVENTION

Figure 1A:
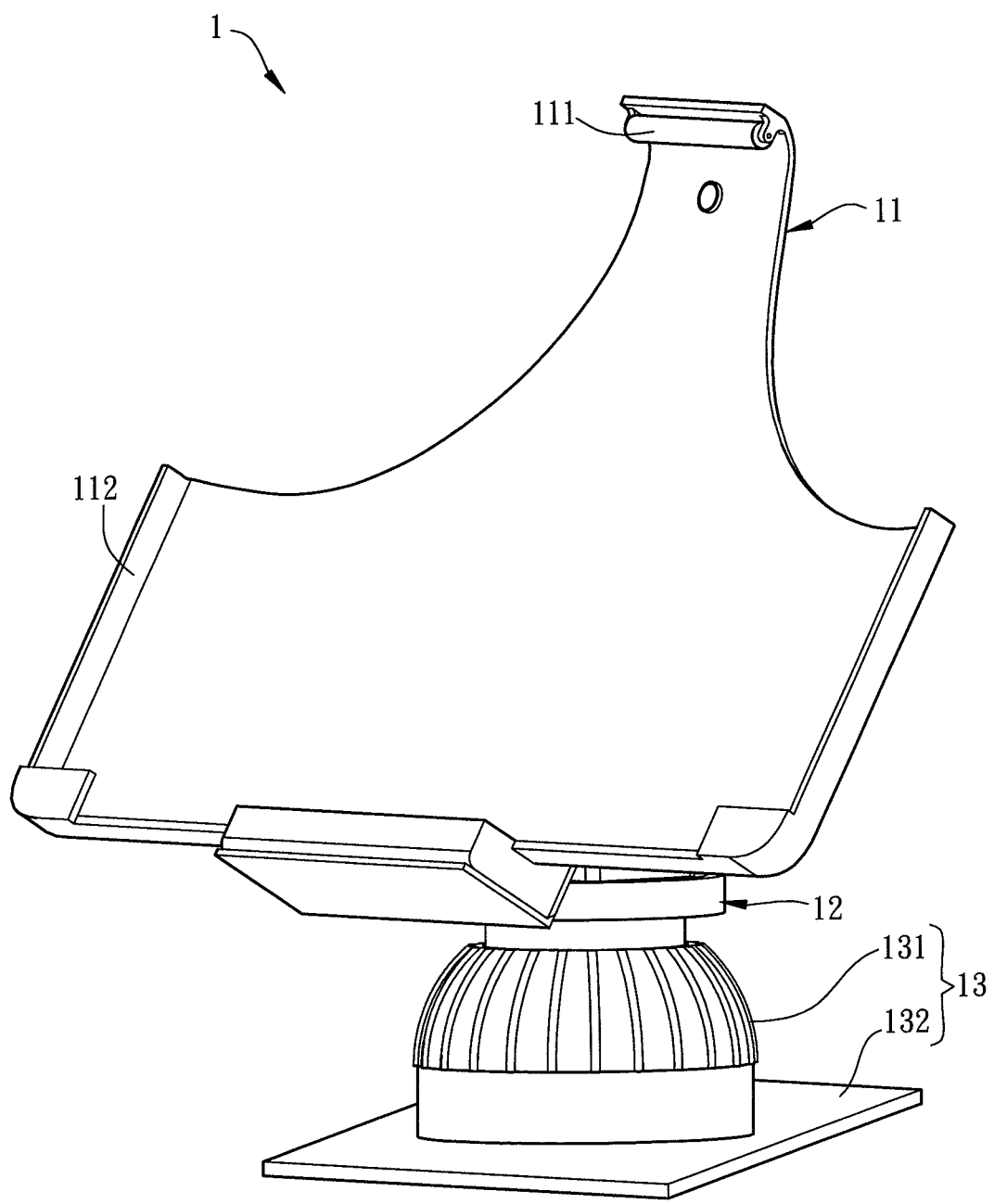
FIG. 1A is a schematic diagram of a supporting device according to an embodiment.
Figure 1B:
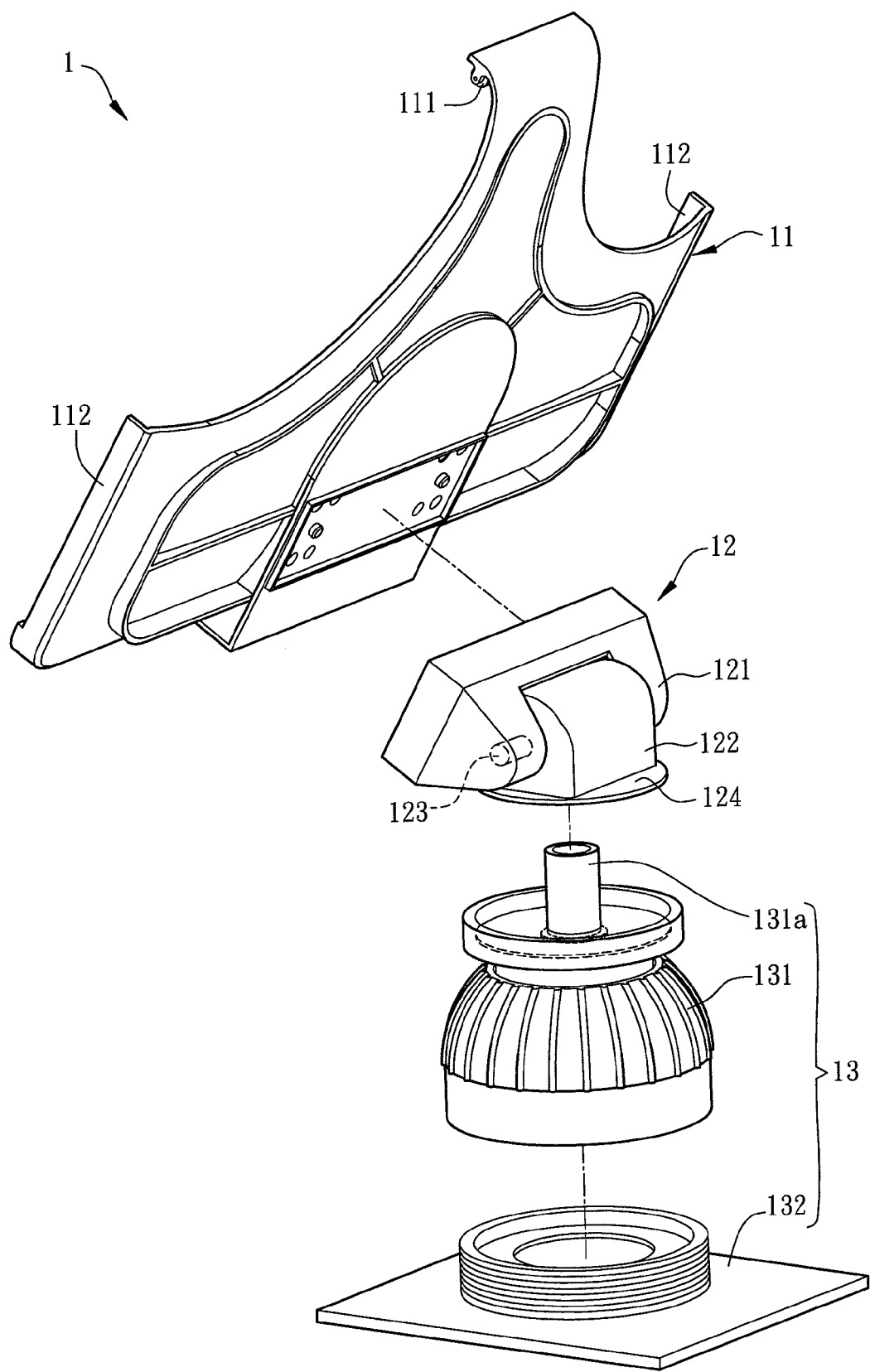
FIG. 1B is an exploded rear view of the supporting device of FIG. 1A.
Figure 1C:
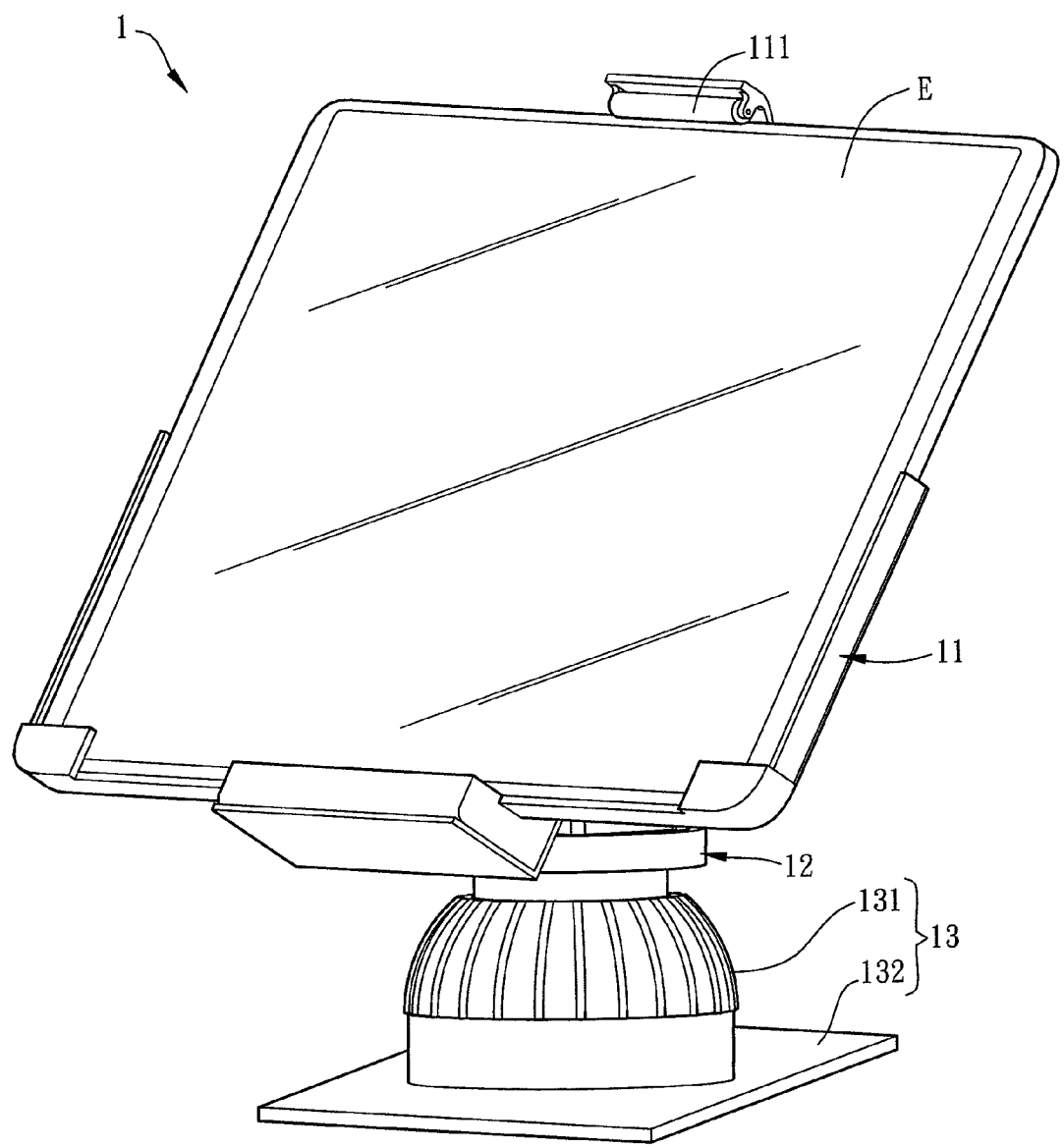
FIG. 1C is a schematic diagram showing the assembled electronic device and supporting device of FIG. 1A.

FIG. 1A is a schematic diagram of a supporting device 1 according to an embodiment, FIG. 1B is an exploded rear view of the supporting device 1 of FIG. 1A, and FIG. 1C is a schematic diagram showing an electronic device E and the supporting device 1 of FIG. 1A, which are assembled. Referring to FIGS. 1A, 1B and 1C, in this embodiment, the supporting device 1 includes a supporting unit 11, an adjusting unit 12 and a fixing unit 13. The fixing unit 13 includes a locking part 131 and a fixing part 132. The supporting device 1 is applied to an electronic device E, such as a tablet computer or a smart phone. The structure features of all components of the supporting device 1 will be described in advance hereinafter.

Referring to FIGS. 1A, 1B and 1C, the supporting unit 11 has a clipping part 111 for fixing the electronic device E. This feature is for illustration only and is not to limit the disclosure. Of course, in other embodiments, the supporting unit 11 may be not equipped with a clipping part 111. The electronic device E can be supported and fixed by the clipping part 111, so that the user can comfortably operate the electronic device E for a long time.

In this embodiment, the supporting unit 11 has a side wall 112, which preferably fits to the shape of the electronic device E. In practice, the shape and size of the supporting unit 11 can be modified according to the applied electronic device E. Moreover, the supporting unit 11 may be configured with skidproof material or element for improving its stability. To be noted, the above-mentioned clipping part 11 as well as the disclosed shape and size is not to limit the present disclosure.

The clipping part 111 can be adjusted with respect to the supporting unit 11 to create a proper accommodating space for fitting the electronic devices E of different sizes. In this embodiment, the clipping part 111 is configured for a tablet computer, so that is can be adjusted corresponding to the size of the tablet computer so as to fixing it on the supporting unit 11. In practice, when the applied electronic E is smaller than the tablet computer, the clipping part 111 is moved to a proper position with respect to the center of the supporting unit 11 for accommodating the electronic device E. Herein, the clipping part 111 has a sliding rail structure, which is not limited, so that it is very convenient to adjust the position of the clipping part 111.

The adjusting unit 12 is connected to the supporting unit 11 for adjusting an angle of the supporting unit 11. In more specific, the adjusting unit 12 has a first adjusting member 121 and a second adjusting member 122. The first adjusting member 121 is connected to the supporting unit 11, and the first adjusting member 121 and the second adjusting member 122 are pivotly connected through a shaft 123. When the first adjusting member 121 is rotated with respect to the second adjusting member 122, the tilting angle of the supporting unit 11 can be adjusted so that the user can easily watch or operate the electronic device E fixed on the supporting unit 11. In this embodiment, the first adjusting member 121 is pivotly connected to the second adjusting member 122 through the shaft 123, so that it is possible to stably adjust the tilting angle of the supporting unit 11. In other embodiments, the first adjusting member 121 and the second adjusting member 122 can be connected to each other by two ball connectors. This configuration can increase the angle of the supporting unit 11 by adjusting the adjusting unit 12.

Except for the above adjustment through the pivotly connection, the locking part 131 may further include a pivot 131a, so that the base 124 of the adjusting unit 12 has a hole for mounting on the pivot 131a to connect with the locking part 131. In more detailed, the second adjusting member 122 of the adjusting unit 12 is connected to the locking part 131 through the pivot 131a, so that it is rotatable about the pivot 131a. When the second adjusting member 122 is rotated, the supporting unit 11 and the adjusting unit 12 can be rotated with respect to the fixing unit 13. Thus, the supporting device 1 can provide multiple viewing angles for users, which is benefit in the circumstance that the user can not easily move.

Figure 1D:
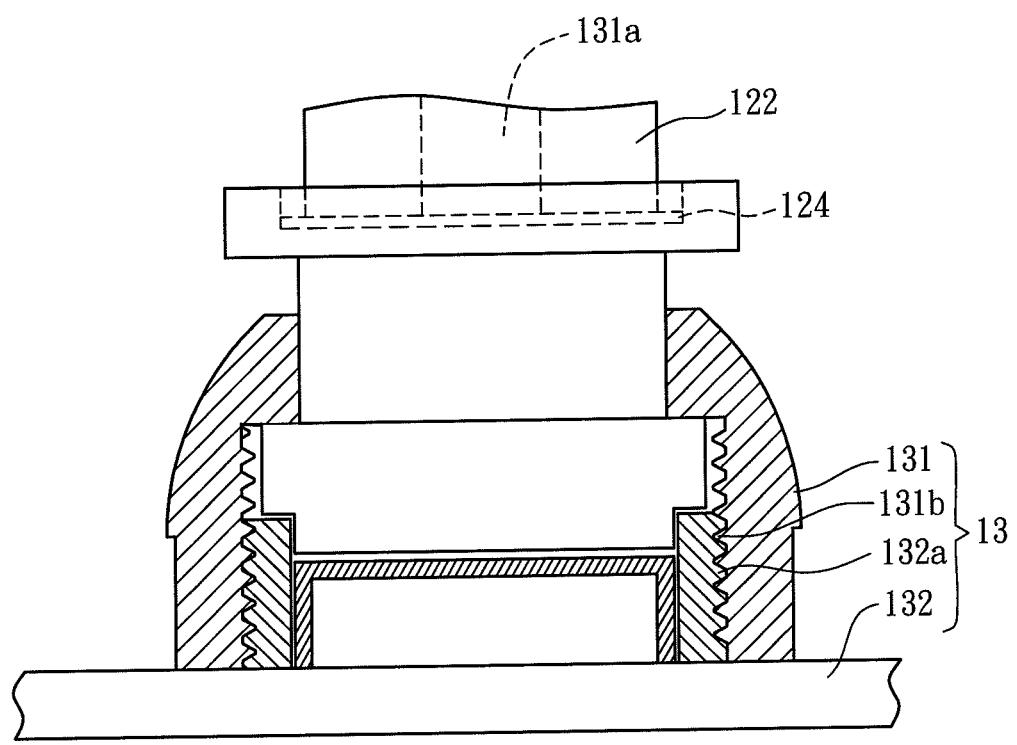
FIG. 1D is a sectional view showing the internal structure of the fixing unit of the supporting device of FIG. 1A.

FIG. 1D is a sectional view showing the internal structure of the fixing unit 13 of the supporting device 1 of FIG. 1A. With reference to FIGS. 1B and 1D, the supporting device 1 is fixed on a surface through the fixing part 132. The surface can be a surface of any object, such as the surface of the object in the operation environment of the electronic device E. For example, the surface is a tabletop. The fixing unit 13 is composed of two detachable parts, the locking part 131 and the fixing part 132. Herein, the locking part 131 and the fixing part 132 can be easily detached or assembled. In general, the fixing part 132 is fixed on a surface at frequently used environments, and the user only carries the residual part of the supporting device 1 while traveling or moving. This feature is benefit in the portable purpose. Moreover, it is possible to install multiple fixing parts 132 at different environments, so that the user can connect the carried part to any of the installed fixing parts 132 in the desired environment. This is very convenient for the user.

In more detailed, the fixing unit 13 can fix the supporting device 1 by the connection of the locking part 131 and the fixing part 132. The inner wall 131b of the locking part 131 has a thread corresponding to a thread formed on outer wall 132a of the fixing part 132. These corresponding threads can align and connect the locking part 131 and the fixing part 132, thereby firmly fixing the locking part 131 to the fixing part 132.

The surface for installing the fixing part 132 is preferably a planar surface. Of course, the surface for installing the fixing part 132 may also be a non-planar surface. In practice, the fixing part 132 can be installed on the surface by adhering, screwing, locking, wedging or the likes. Preferably, a soft pad or a buffer element is configured on the bottom of the fixing part 132 for providing the buffering effect and reducing vibration. This configuration can not only increase the stability of the supporting device 1, but also protect the structures of all components from being damaged by the vibration.

The supporting device 1 can be made of a rigid material such as metal, so that it has better durability. This feature is very important for the supporting device 1 which is frequently carried, thereby preventing the damage and unbalance of the supporting device 1. Otherwise, in other embodiments, the supporting device 1 can also be made of plastic material or elastic material, which makes the supporting device 1 lighter and lower cost.

Figure 1E:
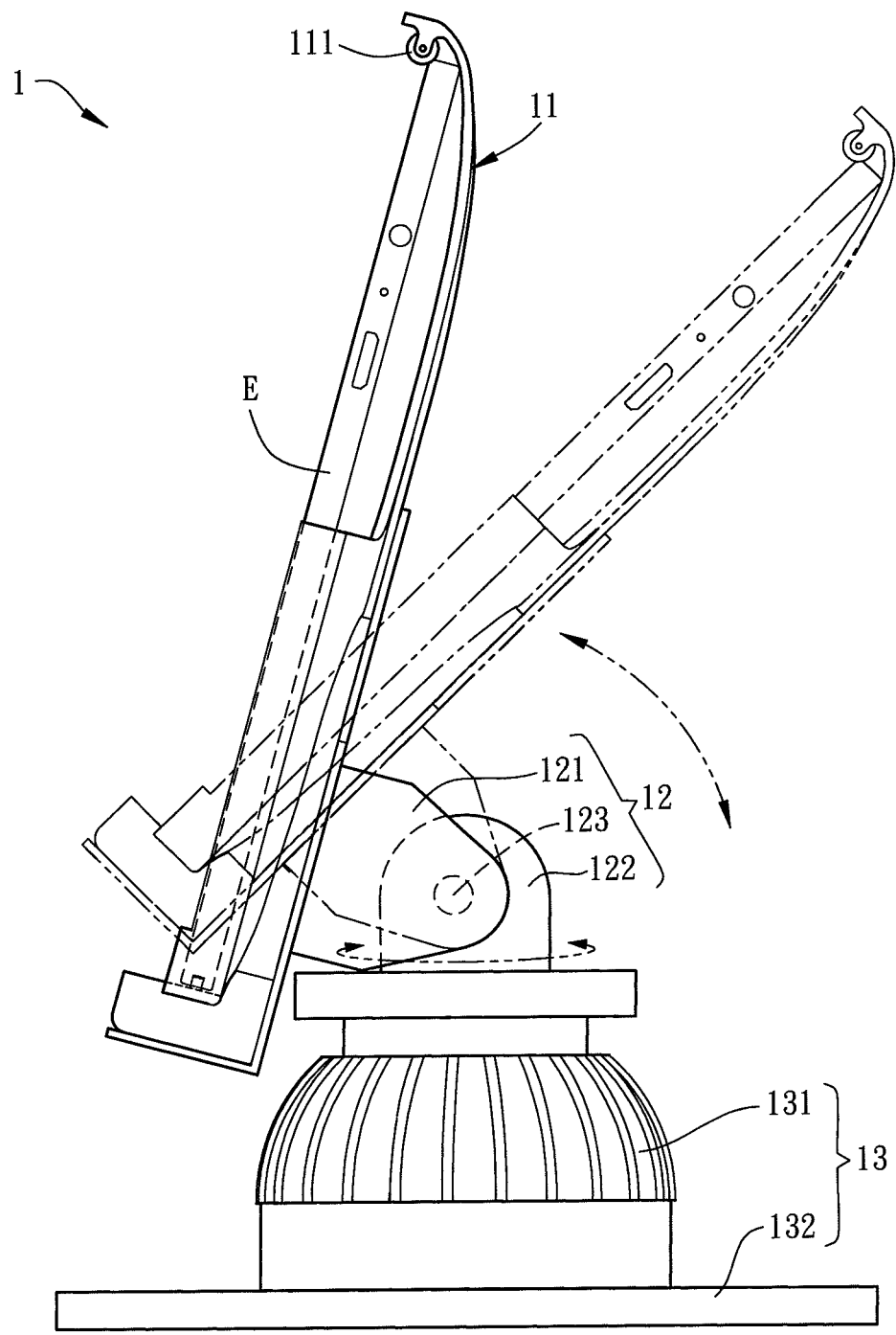
FIG. 1E is a schematic diagram showing the movement of the supporting device of FIG. 1A.

FIG. 1E is a schematic diagram showing the movement of the supporting device 1 of FIG. 1A. Referring to FIGS. 1B and 1E, the fixing part 132 of the fixing unit 13 is firmly disposed on the surface, and the locking part 131 is connected with the fixing part 132. Thus, the supporting device 1 can stably and firmly stand on the surface. Then, the supporting unit 11 supports the electronic device E, so that the view angle of the electronic device E can be easily adjusted by the adjusting unit 12, and the supporting unit 11 and the adjusting unit 12 can be rotated with respect to the fixing unit 13. In this case, the user does not have to hold the electronic device E all the time and can operate it comfortably.

Figure 2A:
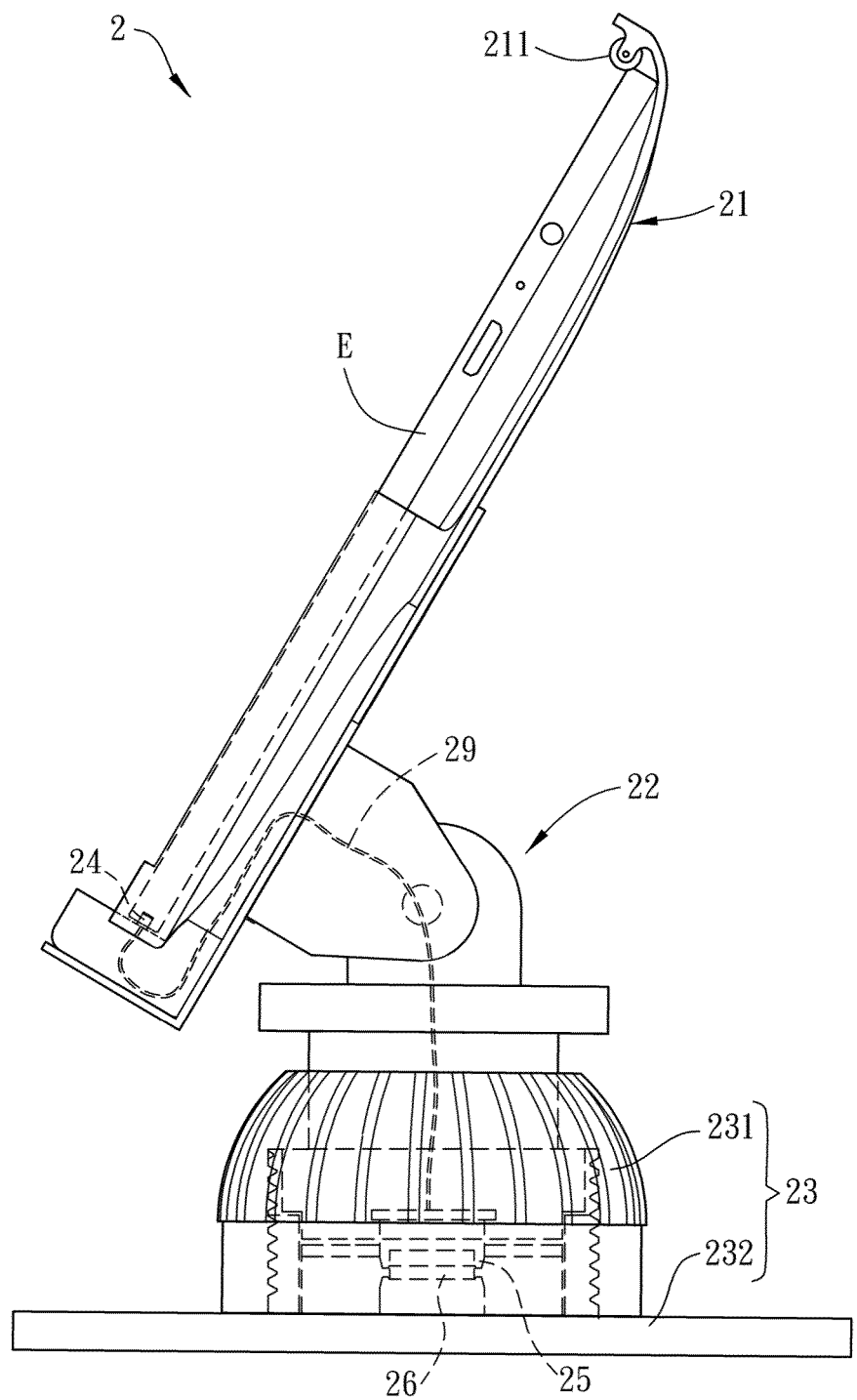
FIG. 2A is a schematic diagram of a supporting device according to another embodiment.

FIG. 2A is a schematic diagram of a supporting device 2 according to another embodiment. In this embodiment, the supporting device 2 may further include at least one connector. Referring to FIG. 2A, the supporting device 2 further includes a first connector 24, a second connector 25, a third connector 26 and a connecting line 29.

The first connector 24 is disposed on the supporting unit 21 for connecting with the electronic device E. In practice, the first connector 24 is connected with a dock connector of the electronic device E. In more specific, the design of the first connector 24 matches the dock connector of the electronic device E. For example, when the dock connector of the electronic device E is a 30-pin connector or a USB connector, the first connector 24 must be corresponding to the 30-pin connector or the USB connector. In addition, the first connector 24 is fixed on and exposed from the bottom of the supporting unit 21, so that it can increase the stability as the first connector 24 is connected to the electronic device E, thereby preventing the unsteady signal or current input. Of course, the first connector 24 can be detachable, so that it is possible to change the proper first connector 24 corresponding to the electronic device E. This configuration can increase the applications of the supporting device 2 and broaden the applicable electronic devices E.

In this embodiment, the second connector 25 is disposed on the locking part 231 for electrically connecting with the first connector 24, and the third connector 26 is disposed on the fixing part 232. In more specific, one end of the connecting line 29 is connected to the first connector 24 and another end of the connecting line 29 is connected to the second connector 25. When the locking part 231 is locked with the fixing part 232, the third connector 26 is electrically connected with the second connector 25.

After connecting the dock connector of the electronic device E to the first connector 24, the electronic device E can be applied with an additional terminal device through the connection of the first connector 24, the second connector 25 and the third connector 26. This configuration can integrate the functions of data transmission and charging.

Figure 2B:
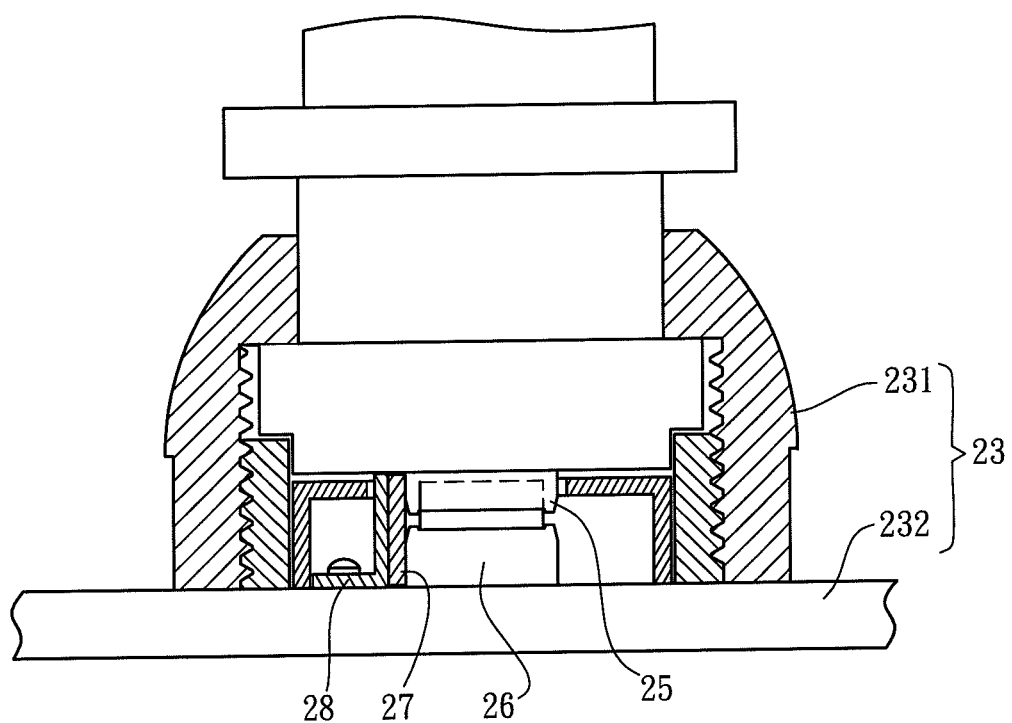
FIG. 2B is a sectional view showing the internal structure of the fixing unit of the supporting device of FIG. 2A.

In order to more firmly connect the second connector 25 and the third connector 26, referring to FIG. 2B, a circuit board 27 is disposed at the connecting portion between the second connector 25 and the third connector 26, and a frame 28 is configured to fasten the circuit board 27 at the connecting portion between the second connector 25 and the third connector 26. In this case, the frame 28 is screwed on the fixing part 232. The circuit board 27 is configured for fixing and electrically connecting the third connector 26, thereby providing the circuit layout and data transmission for the third connector 26, which is not limited herein.

To be noted, although the above embodiment discloses three connectors for example, it is also possible to configure one, two or more connectors in other embodiments. For example, the supporting device may only include a single connector, which is configured to connect to the electronic device and the power source for charging.

Although the disclosure has been described with reference to specific embodiments, this description is not meant to be construed in a limiting sense. Various modifications of the disclosed embodiments, as well as alternative embodiments, will be apparent to persons skilled in the art. It is, therefore, contemplated that the appended claims will cover all modifications that fall within the true scope of the disclosure.

What is claimed is:

1. A supporting device, which is applied to an electronic device, comprising:
a supporting unit supporting the electronic device;
an adjusting unit connecting to the supporting unit for adjusting an angle of the supporting unit;
a fixing unit comprising a locking part and a fixing part;
a first connector disposed on the supporting unit for connecting with the electronic device;
a second connector disposed on the locking part; and
a connecting line, wherein one end of the connecting line is connected to the first connector and another end of the connecting line is connected to the second connector,
wherein the connecting line is disposed within the supporting unit and extends through the adjusting unit and the locking part,
wherein the adjusting unit is connected to the locking part, and an inner wall of the locking part has a first thread is corresponding to a second thread formed on an outer wall of the fixing part, and the locking part is detachably locked with the fixing part to fix the electronic device on the fixing part by the first thread and the second thread.

2. The supporting device of clam 1, wherein the supporting unit has a clipping part for fixing the electronic device.

3. The supporting device of claim 2, wherein the clipping part is adjustable with respect to the supporting unit.

4. The supporting device of claim 1, further comprises:
a third connector disposed on the fixing part, wherein when the locking part is locked with the fixing part, the third connector is connected with the second connector.

5. The supporting device of claim 1, wherein the adjusting unit has a first adjusting member and a second adjusting member, and the first adjusting member is pivotly connected to the second adjusting member.

6. The supporting device of claim 1, wherein the locking part has a pivot, and the adjusting unit is mounted on the pivot for rotatably connected to the locking part.

\* \* \* \* \*